US010219339B1

(12) United States Patent
Howe

(10) Patent No.: US 10,219,339 B1
(45) Date of Patent: Feb. 26, 2019

(54) CURRENT CORRECTION TECHNIQUES FOR ACCURATE HIGH CURRENT SHORT CHANNEL DRIVER

(71) Applicant: IXYS, LLC, Milpitas, CA (US)

(72) Inventor: Bret Ross Howe, Irvine, CA (US)

(73) Assignee: IXYS, LLC, Milpitas, CA (US)

( * ) Notice: Subject to any disclaimer, the term of this patent is extended or adjusted under 35 U.S.C. 154(b) by 0 days.

(21) Appl. No.: 15/899,352

(22) Filed: Feb. 19, 2018

(51) Int. Cl.
| H05B 33/00 | (2006.01) |
| H05B 33/08 | (2006.01) |
| H02J 7/00 | (2006.01) |
| H05B 37/02 | (2006.01) |

(52) U.S. Cl.
CPC ........ H05B 33/0842 (2013.01); H02J 7/0072 (2013.01); H05B 37/0209 (2013.01)

(58) Field of Classification Search
CPC .................. H05B 33/0809; H05B 33/0824
See application file for complete search history.

(56) References Cited

U.S. PATENT DOCUMENTS

| 2017/0075204 A1* | 3/2017 | Gyoten | .............. G03B 21/2053 |
| 2017/0163065 A1* | 6/2017 | Freer | ..................... H02J 7/0052 |

* cited by examiner

Primary Examiner — Monica C King

(57) ABSTRACT

A current driver integrated circuit (IC) is coupled to control current flow through a diode. In one example, the diode is a Light Emitting Diode (LED) having an anode coupled to a supply node supplied by a battery and a cathode coupled to a drive terminal of the current driver IC. During operation the current driver IC is enabled and sinks an output current from the supply node, through the LED, through the drive terminal, and onto a ground node. As current flows through the LED, the battery is discharged. Changes in battery voltage cause an output voltage between the cathode of the LED and the ground node to change. Despite variations in output voltage, the current driver IC maintains a current level of the output current to be within five percent of a desired output current level across an output voltage range of at least 2V.

20 Claims, 10 Drawing Sheets

CURRENT DRIVER WITH
SINGLE DRIVE TRANSISTOR

TOP-DOWN VIEW OF DRIVE
TRANSISTOR

CURRENT TO OUTPUT VOLTAGE PLOTS DURING OPERATION
OF CURRENT DRIVER OF FIG. 1

CURRENT DRIVER WITH TWO HIGH POWER OUTPUT TRANSISTORS

CURRENT TO OUTPUT VOLTAGE PLOTS DURING OPERATION
OF CURRENT DRIVER OF FIG. 4

CURRENT TO OUTPUT VOLTAGE PLOTS DURING OPERATION OF NOVEL CURRENT DRIVER OF FIG. 7

| | CURRENT DRIVER 10 OF FIG. 1 | CURRENT DRIVER 30 OF FIG. 4 | CURRENT DRIVER 51 OF FIG. 9 |
|---|---|---|---|
| SIZE (SQUARE MICRONS) | 50,000 | 100,000 | 59,000 |
| VARIATION OF $I_{OUT}$ FOR $V_{OUT}$ ANYWHERE IN A RANGE FROM 0.3V TO 2.4V | LESS THAN FORTY PERCENT | LESS THAN FORTY PERCENT | LESS THAN FIVE PERCENT (+/- 2%) |

GATE VOLTAGE AS A FUNCTION OF THE CORRECTED CURRENT $I_C$

METHOD OF OPERATING CURRENT DRIVER
INTEGRATED CIRCUIT 51

US 10,219,339 B1

CURRENT CORRECTION TECHNIQUES FOR ACCURATE HIGH CURRENT SHORT CHANNEL DRIVER

TECHNICAL FIELD

The present disclosure relates generally to current driver circuitry, and more particularly to controlling current flow in current driver applications.

BACKGROUND INFORMATION

In typical lighting and light communication applications, a current driver is employed to control current flow through a diode, such as a Light Emitting Diode (LED). In one example, a remote control includes a microcontroller, the current driver, the LED, and a battery that supplies a Direct Current (DC) voltage onto a supply node. One terminal of the LED is coupled to the supply node and another terminal of the LED is coupled in some fashion to the current driver. During operation, the current driver controls an output current that flows through the LED, either by sourcing current from the battery, through the current driver, through the LED and onto a ground node, or by sinking current from the supply node, through the LED, through the current driver, and onto the ground node. Often, the current driver uses a reference current to set a current level of the output current through the LED. The current level of the output current is generally desired to be maintained at a predetermined multiple of the reference current.

As current flows through the LED, the battery discharges. Discharging and charging of the battery causes the battery voltage to change over time. In addition, different applications require different battery voltages. Variation in the battery voltage often causes an output voltage between a terminal of the LED and the ground node to vary. The output voltage variation can vary significantly over time due to the charging and discharging of the battery or depending on the voltage and current demands involved in different applications. This variation in the output voltage tends to cause undesirable changes in the current level of the output current flowing through the LED. A solution that overcomes these shortcomings is desirable.

SUMMARY

A system comprises a supply node, a controller integrated circuit (IC), a current driver IC, a diode, and a ground node. The current driver IC is an example of a high current driver that controls currents greater than at least 200 milliamps through the diode. In one example, the diode is a Light Emitting Diode (LED) and the current driver IC is coupled to sink current from the supply node, through the diode, through the current driver IC, and onto the ground node. The LED has an anode coupled to a supply node and a cathode coupled to a drive terminal of the current driver IC. The current driver has a control terminal coupled to receive a control signal EN from the controller IC that enables (turning on the LED) or disables (turning off the LED) the current driver IC. In one example, the supply node is supplied by Direct Current (DC) source such as a battery. In another example, the supply node is supplied by an Alternating Current (AC) source, such as an AC line.

During operation, the current driver IC is enabled and sinks an output current from the supply node, through the LED, through the drive terminal, and onto a ground node. An output voltage is present between the cathode of the LED and the ground node. The output voltage typically varies due to charge and discharge cycles of the battery which cause the battery voltage to decrease over time. The output voltage may also vary depending on the voltage and current demands across different applications. In addition, changes in temperature of the LED may also cause the output voltage to change. The current driver IC maintains variation of a current level of the output current to be within five percent of a desired output current level when the output voltage is anywhere within at least a two-volt range. For example, the desired output current level is 250 milliamps, and the current driver IC controls the output current to be between 255 milliamps and 245 milliamps when the output voltage is anywhere between at least 0.3 volts and 2.4 volts.

In one embodiment, the current driver integrated circuit comprises a voltage detector circuit, an Output Model Current Mirror (OMCM) circuit, a Corrected Current Mirror (CCM) circuit, a summing node reference current generator circuit, a Corrected Current to Gate Voltage Converter (CCGVC) circuit, a summing node, and a current drive transistor. The voltage detector circuit detects an output voltage on an output node and generates a replica voltage.

The OMCM circuit receives the replica voltage and generates an output model current $I_S$. The output model current $I_S$ models a short channel effect on the current driver transistor. The output model current $I_S$ is a factor of the reference current $I_{REF}$ modulated by the output voltage $V_{OUT}$. In this example, the factor is approximately one. The short channel current modulation is caused by short channel effects present on a transistor of the OMCM circuit that is coupled to detect the replica voltage. The transistor of the OMCM circuit that detects the replica voltage has a drain terminal on which the replica voltage is present. The amount of modulation is adjustable by adjusting the length of the transistor that detects the replica voltage. The length of this transistor is adjusted to increase or decrease the amount of short channel current modulation to match that of the current driver transistor.

In accordance with one novel aspect, the summing node is maintained at a stable current level which is a first factor times a reference current. For example, a current on the summing node is maintained to be twice a reference current ("$2 \times I_{REF}$"). The OMCM circuit supplies the output model current $I_S$ onto the summing node, and the CCM circuit generates and supplies a corrected current $I_C$ onto the summing node. Because the current on the summing node is substantially constant, and because both the output model current $I_S$ and the corrected current $I_C$ are supplied onto the summing node, as the output model current $I_S$ decreases, the corrected current $I_C$ increases.

A scaled corrected current $I_D$ is used to generate a gate voltage that controls operation of the current driver transistor. The CCM circuit generates the scaled corrected current $I_D$ by scaling the corrected current $I_C$ by a second factor. For example, the scaled corrected current $I_D$ is fifteen times the corrected current $I_C$. The CCGVC circuit receives the scaled corrected current $I_D$ and converts the scaled corrected current $I_D$ into a gate voltage. The CCGVC circuit supplies the gate voltage onto a gate terminal of the current driver transistor. The gate voltage controls the conductivity of the current driver transistor such that current flow through the diode remains within five percent of the desired output current level over at least a 2V range of the output voltage. The desired output current level is a third factor times the scaled corrected current $I_D$. For example, the current level of the output current $I_{OUT}$ is two-hundred and six times the scaled corrected current $I_D$. In this way, the increase in corrected current $I_C$ compensates for the decrease in output model current due to variation in the output voltage $V_{OUT}$ thereby controlling the current level of the output current $I_{OUT}$ to be maintained within five percent of the desired output current level.

The foregoing is a summary and thus contains, by necessity, simplifications, generalizations and omissions of detail. Consequently, it is appreciated that the summary is illustrative only. Still other methods, structures and details are set forth in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

Reference will now be made in detail to exemplary embodiments of the invention, examples of which are illustrated in the accompanying drawings.

DETAILED DESCRIPTION

Figure 1:
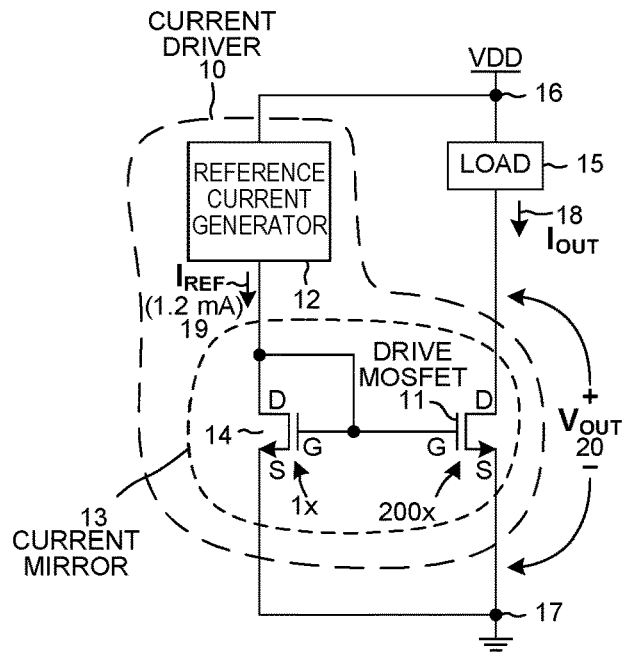
FIG. 1 is a circuit diagram of a current driver circuit 10 having a single drive transistor 11.

FIG. 1 is a circuit diagram of a current driver circuit 10 having a single drive transistor 11. The current driver circuit 10 includes a reference current generator 12 and a current mirror circuit 13. The current mirror circuit includes the drive field effect transistor 11 and field effect transistor 14. A gate terminal of transistor 14 is coupled to a drain terminal of the transistor 14. The gate terminal of transistor 14 is also coupled to a gate terminal of the drive transistor 11. In the example of FIG. 1, the drive transistor 11 is approximately two-hundred ("200") times the size of transistor 14. The current driver circuit 10 drives load 15 from supply node 16. A load 15 is coupled between a supply node 16 and a drain terminal of the drive transistor 11. A source terminal of the drive transistor 11 is coupled to a ground node 17.

During operation of the current driver circuit 10, the current driver circuit 10 drives the load 15 by sinking current $I_{OUT}$ 18 from a supply node 16 through the load 15 through the drive field effect transistor 11 and onto a ground node 17. The reference current generator circuit 12 outputs a reference current $I_{REF}$ 19 onto a drain terminal of the transistor 14. The output current $I_{OUT}$ 18 that flows through the load 15 is a factor of the reference current $I_{REF}$ 19. The factor is determined by a ratio of the size of the drive transistor 11 to the size of the transistor 14. In this example, the factor is two-hundred ("200") because the drive transistor 11 is approximately two-hundred ("200") times the size of transistor 14. The output current $I_{OUT}$ 18 will be 200 times the reference current $I_{REF}$ 19. In this example, the reference current $I_{REF}$ 19 is approximately 1.2 milliamps and the output current $I_{OUT}$ 18 will be approximately 240 milliamps.

Figure 3:
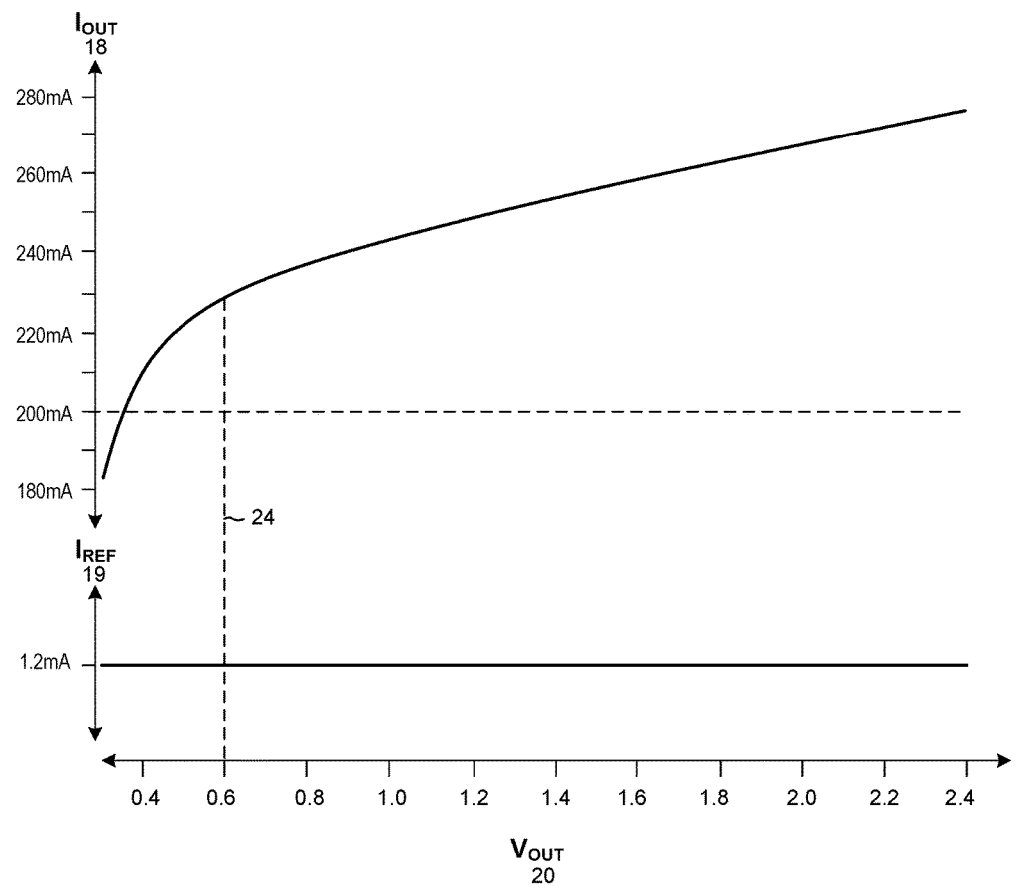
FIG. 3 is a diagram showing graphs of the output current $I_{out}$ 18 and reference current $I_{REF}$ 19 versus the output voltage $V_{out}$ 20 during operation of the current driver circuit 10 shown in FIG. 1.

In most applications of current driver circuit 10, it is desirable for the output current $I_{OUT}$ 18 to remain constant and at a fixed factor of the reference current $I_{REF}$ 19 across a range of output voltage $V_{OUT}$ 20. However, during operation of the current driver circuit 10, the output current $I_{OUT}$ 18 tends to change as the output voltage $V_{OUT}$ 20 changes. As shown in FIG. 3, the output current $I_{OUT}$ 18 varies approximately 90 milliamps over a 2V range of output voltage 20.

Figure 2:
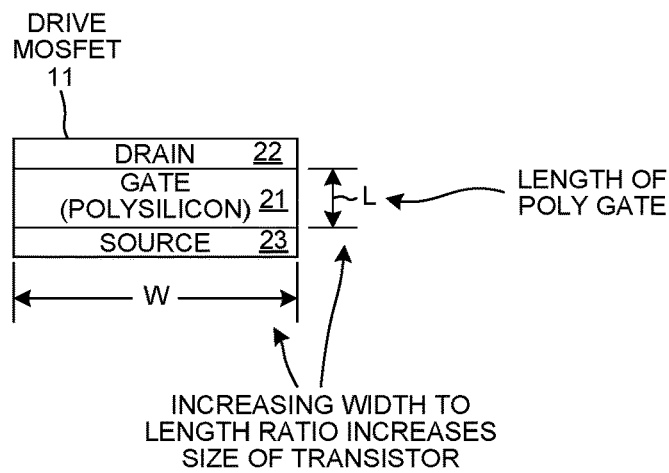
FIG. 2 is a diagram of a top-down view of drive transistor 11 shown in FIG. 1.

FIG. 2 is a diagram of a top-down view of drive transistor 11 shown in FIG. 1. The drive transistor 11 includes a polysilicon gate 21, a drain region 22, and a source region 23. The variation of the output current $I_{OUT}$ 18 can be minimized by increasing length L of the polysilicon gate 21. However, increasing the length L requires increasing the width W to maintain the same width to length ratio of the drive transistor 11, which in turn, increases the overall size of drive transistor 11. Increasing the size of drive transistor 11 is generally undesirable due to increased die area that would be consumed by the drive transistor 11. For example, if the width W increases by a factor of two ("2"), then the length L would also be increased by a factor of two ("2") to maintain the width to length ratio. Thus, in this example, an overall die area of the transistor would increase by a factor of four ("4").

FIG. 3 is a diagram showing graphs of the output current $I_{out}$ 18 and reference current $I_{REF}$ 19 versus the output voltage $V_{out}$ 20 during operation of the current driver circuit 10 shown in FIG. 1. The output voltage $V_{out}$ 20 extends approximately 2V ranging from 0.4 V to 2.4V. The reference current $I_{REF}$ 19 is set at a constant 1.2 milliamps over the range of output voltages. The output current extends from around 185 milliamps to approximately 275 milliamps over the range of output voltages. The current driver circuit 10 shown in FIG. 1 has an output current 18 that varies approximately 90 milliamps over a 2.0V range of output voltages. As identified by dashed line 24, when the output voltage $V_{out}$ 20 is less than 0.6V, the output current $I_{out}$ 18 increases much more rapidly as compared to when the output voltage $V_{OUT}$ 20 is greater than 0.6 V.

Figure 4:
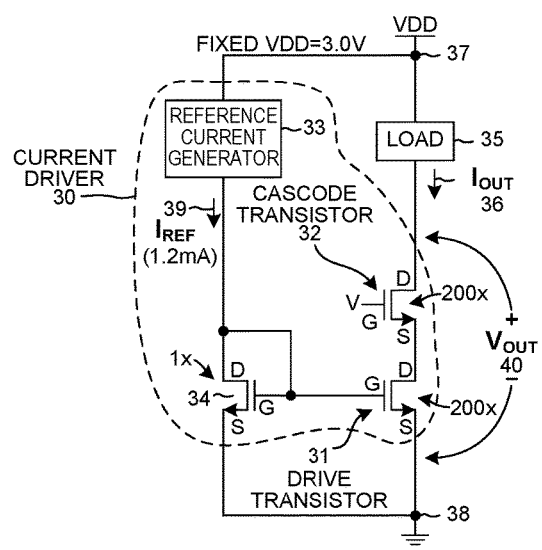
FIG. 4 is a circuit diagram of a current driver circuit 30 having two high power output transistors 31 and 32.

FIG. 4 is a circuit diagram of a current driver circuit 30 having two high power output transistors 31 and 32. Current driver circuit 30 comprises a reference current generator 33, the drive transistor 31, and the cascode transistor 32. A drain terminal of the cascode transistor 32 is coupled to load 35. A source terminal of the cascode transistor 32 is coupled to a drain terminal of the drive transistor 31. During operation, the current driver circuit 30 sinks an output current $I_{OUT}$ 36 from the supply node 37, through load 35, through cascode transistor 32, through drive transistor 31, and onto a ground node 38. The reference current generator 33 outputs a reference current $I_{REF}$ 39 onto a drain terminal of the transistor 34. The output current $I_{OUT}$ 36 is a factor of the reference current $I_{REF}$ 39. The factor depends upon a width to length ratio of the drive transistor 31 and a width to length ratio of transistor 34. An output voltage $V_{OUT}$ 40 is present between a drain terminal of the cascode transistor 32 and a source terminal of the drive transistor 31. In this example, the cascode transistor 32 and the drive transistor 31 are each two-hundred ("200") times a size of the transistor 34.

Figure 5:
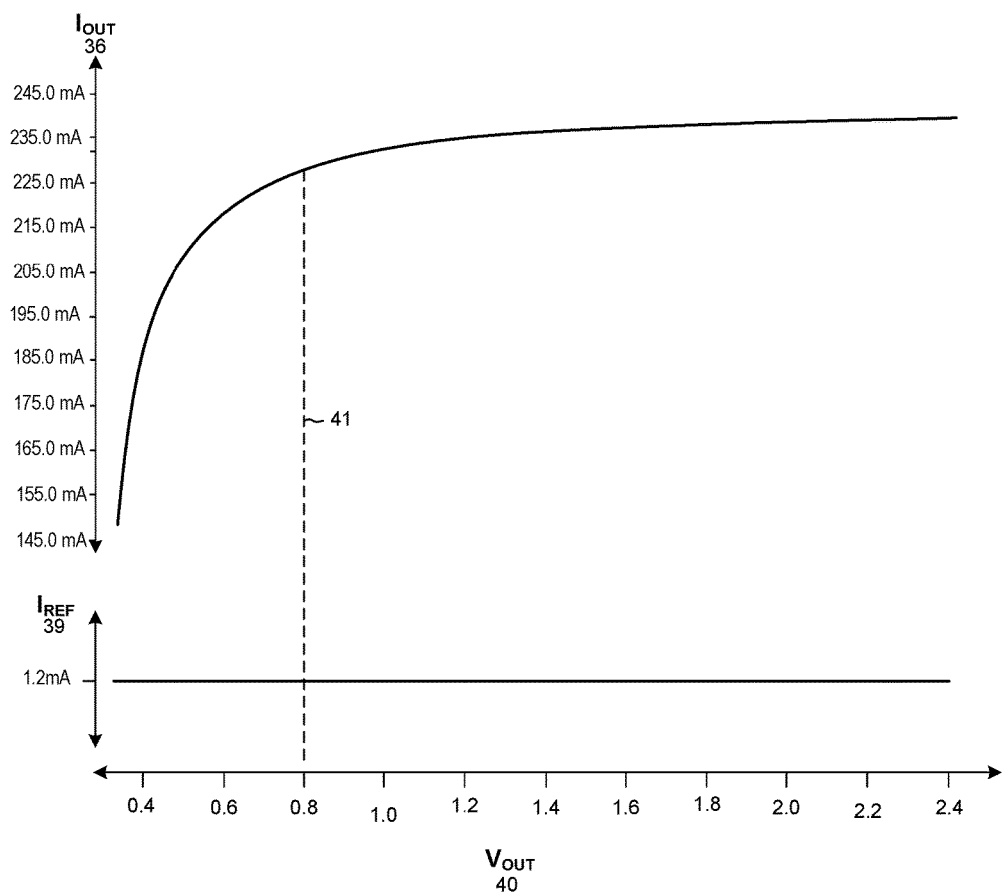
FIG. 5 is a diagram showing graphs of the output current $I_{OUT}$ 36 and reference current $I_{REF}$ 39 versus the output voltage $V_{out}$ 40 during operation of the current driver circuit 30 shown in FIG. 4.

FIG. 5 is a diagram showing graphs of the output current $I_{OUT}$ 36 and reference current $I_{REF}$ 39 versus the output voltage $V_{out}$ 40 during operation of the current driver circuit 30 shown in FIG. 4. The output current $I_{OUT}$ 36 tends to vary depending on the output voltage $V_{OUT}$ 40. As identified by dashed line 41, when the output voltage $V_{out}$ 40 is less than 0.8V, the output current $I_{out}$ 36 increases much more rapidly as compared to when the output voltage $V_{OUT}$ 40 is greater than 0.8 V. Over a range of 2V of the output voltage $V_{OUT}$ 40, the current $I_{OUT}$ 36 of the current driver circuit 30 varies by approximately 100 milliamps.

Figure 6:
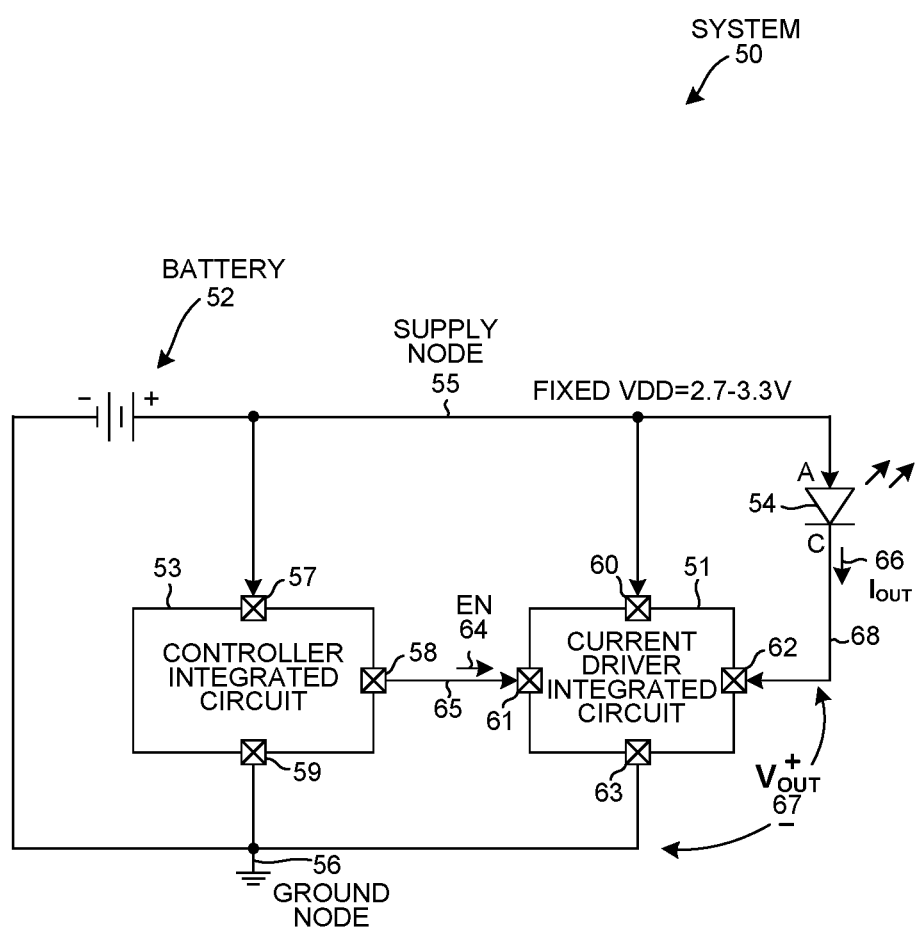
FIG. 6 is a circuit diagram of system 50 involving a novel current driver integrated circuit 51.

FIG. 6 is a circuit diagram of system 50 involving a novel current driver integrated circuit 51. System 50 comprises the current driver integrated circuit 51, a battery 52, a controller integrated circuit 53, a diode 54, a supply node 55, and a ground node 56. The battery 52 has a positive terminal that is coupled to the supply node 55, and a negative terminal that is coupled to the ground node 56. The battery 52 controls the supply node 55 to be at a fixed voltage VDD. For example, VDD is between 2.7 V and 3.3 V. In this example, diode 54 is a light emitting diode (LED). In one example, system 50 is part of a remote control in which current is pulsed through the diode thereby radiating energy used in wireless communication.

The controller integrated circuit 53 has a supply terminal 57, a control terminal 58, and a ground terminal 59. The supply terminal 57 of the controller integrated circuit 53 is coupled to the supply node 55. The ground terminal 59 of the controller integrated circuit 53 is coupled to the ground node 56. The current driver integrated circuit 51 has a supply terminal 60, a control terminal 61, a drive terminal 62, and a ground terminal 63. The supply terminal 60 of the current driver integrated circuit 51 is coupled to the supply node 55. The ground terminal 63 of the current driver integrated circuit 51 is coupled to the ground node 56. The control terminal 61 of the current driver integrated circuit 51 is coupled to the control terminal 58 of the controller integrated circuit 53. In one example, the current driver IC 51 is an integrated circuit die and the terminals 60-63 are bond pads.

Diode 54 has an anode terminal A that is coupled to the supply node 55. Diode 54 has a cathode terminal C that is coupled to the drive terminal 62 of the current driver integrated circuit 51. In the example of FIG. 6, the controller integrated circuit 53 and current driver integrated circuit 51 are supplied by a direct current (DC) source, however, in other embodiments the controller integrated circuit 53 and the current driver integrated circuit 51 are supplied from an Alternating Current (AC) source.

During operation, the diode 54 is initially off and in a non-conductive state such that no current is flowing through diode 54. Next, the controller integrated circuit 53 determines that the diode 54 is to switch from a non-conductive state to a conductive state such that current is to flow through the diode 54. Controller integrated circuit 53 asserts a control signal EN 64 that is supplied from the control terminal 58 onto the control terminal 61 of the current driver integrated circuit 51 via conductor 64. In response to detecting the control signal EN 64 switching from a digital logic low level to a digital logic high-level, the current driver integrated circuit 51 sinks current from the supply node 55 through the diode 66, and onto the ground node 56 through the current driver integrated circuit 51. Current flows from the supplying node 55, onto the anode terminal of diode 54, through the diode 54 and out of the cathode terminal of the diode 54, onto the drive terminal 62 of the current driver integrated circuit 51, through the current driver integrated circuit 51, out of the ground terminal 63, and onto the ground node 56. An output voltage $V_{OUT}$ 67 is present between conductor 68 and ground node 56.

In accordance with one novel aspect, the current driver integrated circuit 51 drives the diode 54 such that the output current $I_{OUT}$ 66 varies by less than 10% over a range of output voltage $V_{OUT}$ 67. For example, the battery voltage might start out at 3.6V and a typical voltage drop across the LED might be 1.2V, so the output voltage $V_{OUT}$ 67 would be 2.4V. If the battery discharges to 1.8V, then the output voltage $V_{OUT}$ 67 could decrease to 0.6V. Despite the variation in the output voltage $V_{OUT}$ 67, the output current $I_{OUT}$ 66 remains within a desired output current range where the output voltage $V_{OUT}$ 67 ranges between 0.4V and 2.4V (or a 2V range). In one example, the current driver integrated circuit 51 drives the diode 54 such that the output current $I_{OUT}$ 66 varies by less than four percent over at least a two-volt range of output voltages $V_{OUT}$ 67. In another example, the current driver integrated circuit 51 drives the diode 54 such that the output current $I_{OUT}$ 66 varies by less than ten percent over at least a two-volt range of output voltages $V_{OUT}$ 67.

Figure 7:
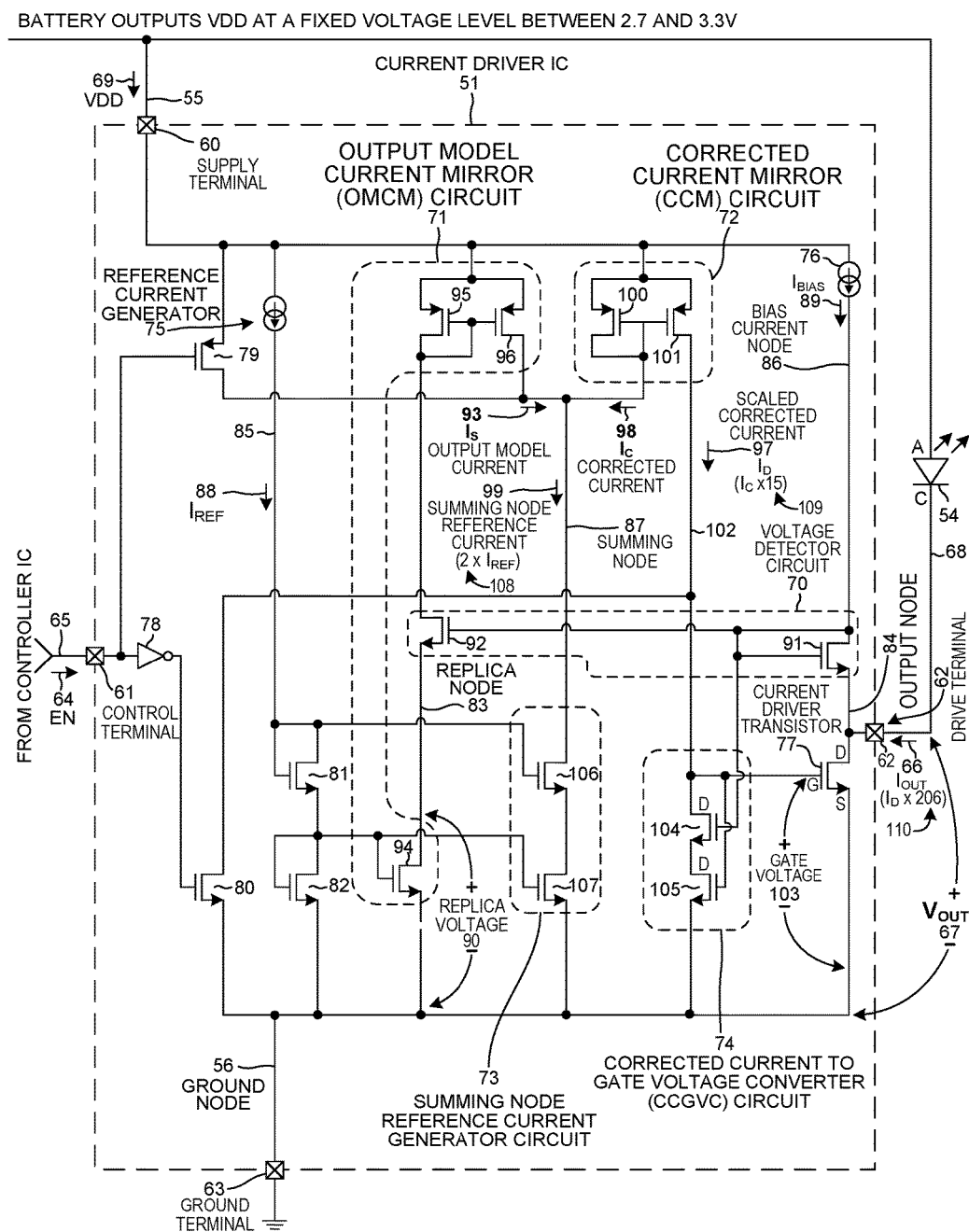
FIG. 7 is a detailed circuit diagram of the current driver integrated circuit 51 shown in FIG. 6.

FIG. 7 is a detailed circuit diagram of the current driver integrated circuit 51 shown in FIG. 6. The current driver integrated circuit 51 comprises voltage detector circuit 70, an Output Model Current Mirror (OMCM) circuit 71, a Corrected Current Mirror (CCM) circuit 72, a summing node reference current generator circuit 73, a Corrected Current To Gate Voltage Converter (CCGVC) circuit 74, a reference current generator 75, a bias current generator 76, a current drive transistor 77, an inverter 78, transistors 79, 80, 81 and 82, a replica node 83, an output node 84, a reference current node 85, a bias current node 86, and a summing node 87. The reference current generator 75 generates and outputs a reference current $I_{REF}$ 88 onto the reference current node 85. The bias current generator 76 generates and outputs a bias current $I_{BIAS}$ 89 on to the bias current node 86.

The voltage detector circuit 70 detects the output voltage $V_{OUT}$ 67 on the output node 84 and generates a replica voltage 90. The voltage detector circuit 70 outputs the generated replica voltage 90 onto the replica node 83. The voltage detector circuit 70 comprises a first transistor 91 and a second transistor 92. A drain terminal and a gate terminal of first transistor 91 are coupled to the bias current node 86 and receives the bias current $I_{BIAS}$ 89. A source terminal of the first transistor 91 is coupled to the output node 84. A gate of the first transistor 91 is coupled to a gate of the second transistor 92. The detected output voltage $V_{OUT}$ 67 plus the voltage required to turn on the first transistor 91 is received onto the gate of the second transistor 92. A drain terminal of the second transistor 92 is coupled to the OMCM circuit 71 and a source terminal of the second transistor 92 is coupled to the replica node 83.

The Output Model Current Mirror (OMCM) circuit 71 receives the replica voltage 90 generated by the voltage detector circuit 70 and generates an output model current $I_S$ 93. The output model current $I_S$ 93 is supplied onto the summing node 87. The output model current $I_S$ 93 is also referred to as a model short channel effect current because it models a short channel effect on the current driver transistor 77. The OMCM circuit 71 outputs the generated output model current $I_S$ 93 onto the summing node 87. The output model current $I_S$ 93 is a factor of the $I_{REF}$ current 88 modulated by the output voltage $V_{OUT}$ 67. In this example, the factor is approximately one. The short channel current modulation is due to short channel effects present on transistor 94. The amount of modulation is adjusted by adjusting the length of transistor 94 to increase or decrease the amount of short channel current modulation to match that of current driver transistor 77.

The OMCM circuit 71 comprises a first transistor 94, second transistor 95, and a third transistor 96. The second transistor 95 and the third transistor 96 form a current mirror. The gate of the second transistor 95 is coupled to the gate of the third transistor 96 and to a drain terminal of the second transistor 95. The gates of both the second transistor 95 and the third transistor 96 are coupled to a drain terminal of the second transistor 92 of the voltage detector circuit 70. Source terminals of the second transistor 95 and the third transistor 96 are coupled to the supply node 55 via the supply terminal 60. A drain terminal of the third transistor 96 is coupled to the summing node 87.

The Corrected Current Mirror (CCM) circuit 72 generates a scaled corrected current 97. The CCM circuit 72 generates the scaled corrected current 97 by scaling a corrected current 98. The corrected current 98 is supplied onto the summing node 87. A summing node reference current 99 is present on the summing node 87. The summing node reference current 99 is fixed and independent of the supply voltage VDD. The summing node reference current 99 is a sum of the output model current $I_S$ 93 and the corrected current $I_C$ 98. The corrected current $I_C$ 98 is a difference between the summing node reference current 99 and the output model current $I_S$ 93.

The CCM circuit 72 comprises a current mirror that includes a first transistor 100 and a second transistor 101. Source terminals of the first transistor 100 and the second transistor 101 are coupled to the supply node 55 via the supply terminal 60. Gates of the first transistor 100 and the second transistor 101 are coupled to the drain terminal of the first transistor 100 and to the summing node 87. A drain terminal of the second transistor 101 is coupled to a gate voltage node 102.

The Corrected Current to Gate Voltage Converter (CCGVC) circuit 74 receives the scaled corrected current $I_D$ 97. The CCGVC circuit 74 converts the scaled corrected current $I_D$ 97 onto a gate voltage 103. The CCGVC circuit 74 supplies the generated gate voltage 103 onto a gate terminal of the current driver transistor 77. The gate voltage 103 is a function of the scaled corrected current $I_D$ 97. The gate voltage 103 controls the conductivity of the current driver transistor 77 and in turn, controls current flow through the diode 54.

The CCGVC circuit 74 comprises a first transistor 104 and a second transistor 105. A drain terminal of the first transistor 104 is coupled to gate voltage node 102. A source terminal of the first transistor 104 is coupled to a drain terminal of the second transistor 105. A gate of the first transistor 104 is coupled to the bias current node 86 and to the gate of the first transistor 91 of the voltage detector circuit 70. A gate terminal of the second transistor 105 is coupled to the gate voltage node 102. A source terminal of the second transistor 105 is coupled to the ground node 56 via the ground terminal 63.

The summing node reference current generator circuit 73 generates the summing node reference current 99 on the summing node 87. The reference current generator circuit 73 comprises a first transistor 106 and a second transistor 107. The summing node reference current generator circuit 73 maintains a current level of the summing node reference current 99 on the summing node 87 to be at a current level equal to the reference current $I_{REF}$ 88 times a first factor 108. In this example the first factor is two ("2") and consequently the summing node reference current 99 is maintained to be twice the reference current $I_{REF}$ 88. Because this summing node reference current 99 on the summing node 87 is maintained at twice the reference current $I_{REF}$ 88, the output model current $I_S$ 93 and corrected current $I_C$ 98 supplied onto the summing node 87 change in an opposite manner. For example, a decrease in the output model current 93 during the operating mode results in a corresponding increase in the corrected current $I_C$ 98. As the output voltage $V_{OUT}$ 67 decreases mainly due to discharge of battery 52, the output model current $I_S$ 93 tends to decrease. In response, the corrected current $I_C$ 98 increases thereby causing the output current 66 to remain within five percent of the desired output current over at least a 2V range of the output voltage 67.

Figure 8:
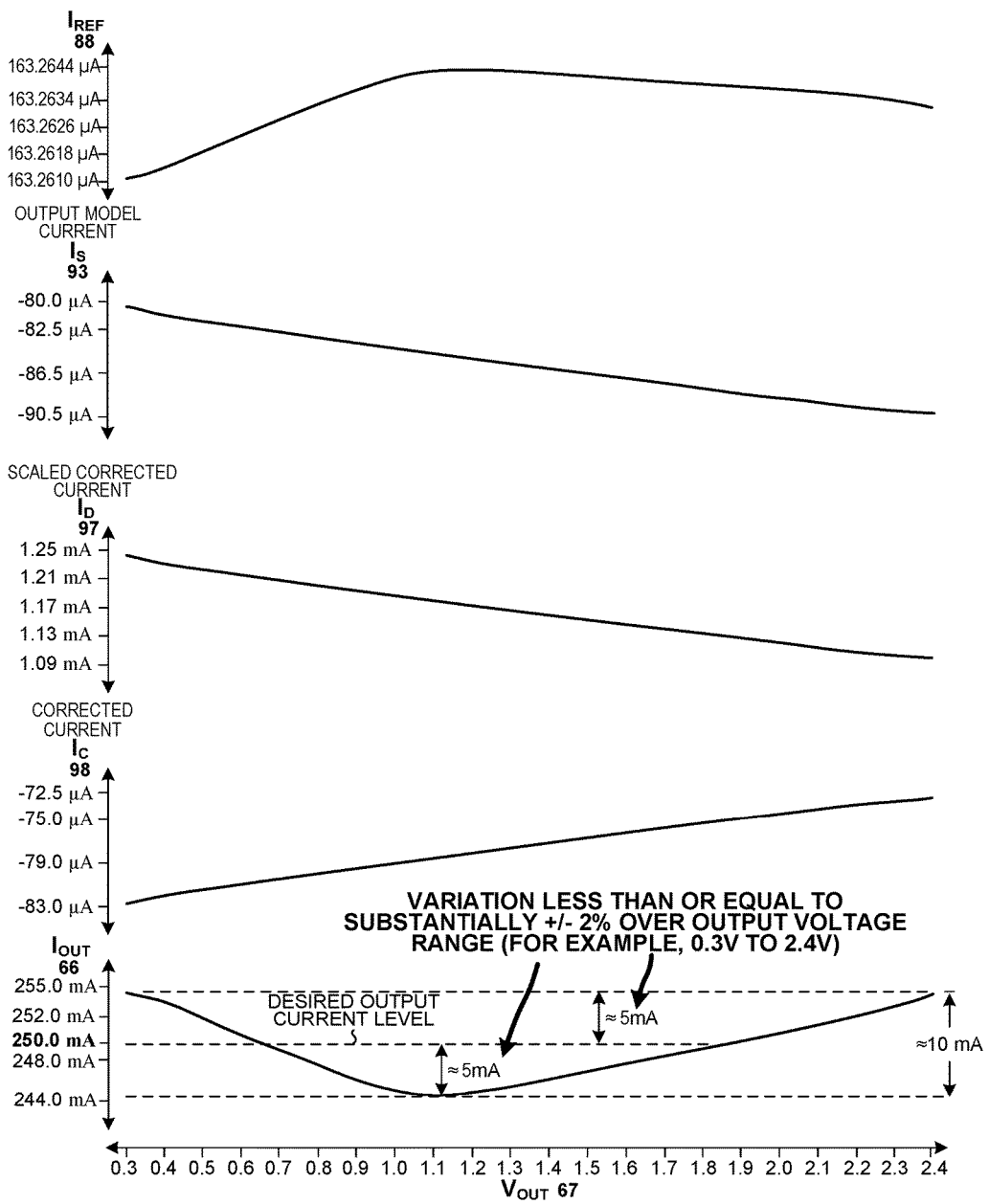
FIG. 8 is a graph of current on various nodes versus the output voltage $V_{OUT}$ 67 during operation of the current driver integrated circuit 51 shown in FIG. 7.

FIG. 8 is a graph of current on various nodes versus the output voltage $V_{OUT}$ 67 during operation of the current driver integrated circuit 51 shown in FIG. 7. The desired current level of the output current $I_{OUT}$ 66 is approximately 250.0 milliamps. As shown in FIG. 8, the current level of the output current $I_{OUT}$ 66 remains within +/−5.0 milliamps of the desired current level. Due to the novel control technique, the output current $I_{OUT}$ 66 varies less than +/−2% of the desired current level when the output voltage $V_{OUT}$ 67 is between 0.3 volts and 2.4 volts. The current driver integrated circuit 51 yields a substantially more stable output current as compared to the current driver 10 shown in FIG. 1 and compared to the current driver 30 shown in FIG. 4.

Figure 9:
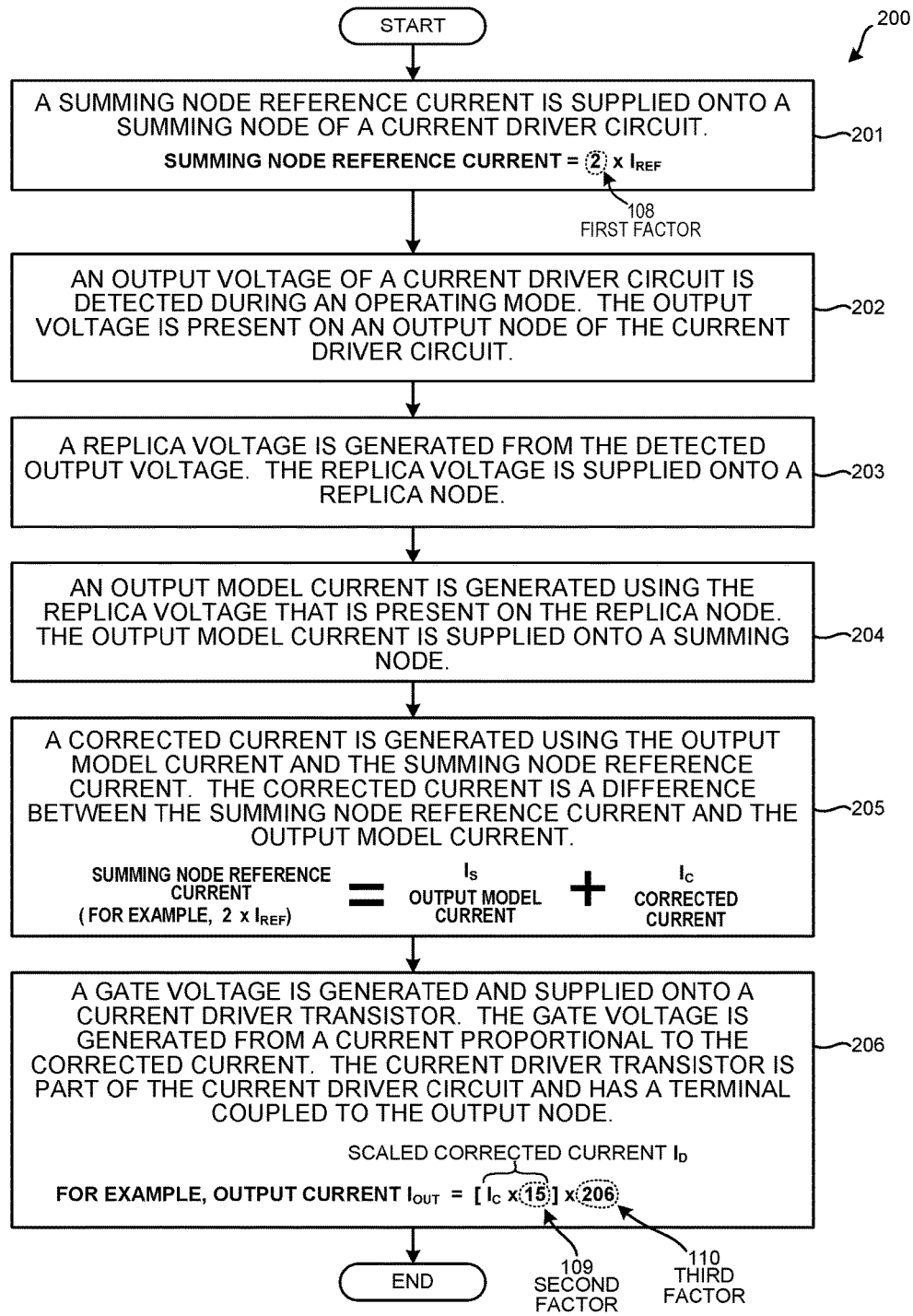
FIG. 9 is a flowchart of a method 200 in accordance with one novel aspect.

FIG. 9 is a flowchart of a method 200 in accordance with one novel aspect. In a first step (step 201), a summing node reference current is supplied onto a summing node of a current driver circuit. For example, in the current driver IC 51 of FIG. 7, the summing node reference current 99 on the summing node 87 is maintained at a stable and constant current level by the summing node reference current generator circuit 73. The current level is a first factor 108 times the reference current $I_{REF}$ 88 (for example, "$2 \times I_{REF}$").

In a second step (step 202), an output voltage of a current driver circuit is detected during an operating mode. The output voltage is present on an output node of the current driver circuit. In the example of the current driver IC 51 of FIG. 7, the output voltage $V_{OUT}$ 67 present between the output node 84 and the ground node 56 is detected by the voltage detector circuit 70. In one example, the voltage detector circuit 70 is a source follower circuit.

In a third step (step 203), a replica voltage is generated from the detected output voltage. The replica voltage is supplied onto a replica node. In the example of FIG. 7, the voltage detector circuit 70 generates a replica voltage 90 that is supplied onto the replica node 83. The replica voltage 90 changes proportionally with respect to the output voltage $V_{OUT}$ 67.

In a fourth step (step 204), an output model current is generated using the replica voltage that is present on the replica node. The output model current is supplied onto a summing node. In the example of FIG. 7, the OMCM circuit 71 receives the replica voltage 90 from the replica node 83 and generates therefrom an output model current $I_S$ 93. The OMCM circuit 71 supplies the generates output model current $I_S$ 93 onto the summing node 87.

In a fifth step (step 205), a corrected current is generated using the output model current and the summing node reference current. The corrected current is a difference between the summing node reference current and the output model current. In the example of FIG. 7, the CCM circuit 72 generates a corrected current $I_C$ 98 that is supplied onto the summing node 87. Because the summing node 87 is maintained at the constant current level ("$2 \times I_{REF}$"), as the output model current $I_S$ 93 decreases, this causes the corrected current $I_C$ 98 to increase in a corresponding fashion.

In a sixth step (step 206), a gate voltage is generated and supplied onto a current driver transistor. The gate voltage is generated from a current proportional to the corrected current. The current driver transistor is part of the current driver circuit and has a terminal coupled to the output node. For example, in the current driver IC 51 of FIG. 7, the CCM circuit 72 generates a scaled corrected current $I_D$ 97 and supplies the scaled corrected current $I_D$ 97 onto the CCGVC circuit 74. The scaled corrected current $I_D$ 97 has a current level that is a second factor 109 times the corrected current $I_C$ 98, for example "$15 \times I_C$". The scaled corrected current $I_D$ 97 is proportional to the corrected current $I_C$ 98. The CCGVC circuit 74 receives the scaled corrected current $I_D$ 97 and generates therefrom a gate voltage 103 that is supplied onto the gate of the current driver transistor 77. The drain of the current driver transistor 77 is coupled to the output node 84 via the drive terminal 62. The gate voltage 103 controls the output current $I_{OUT}$ 66 to have a current level that is a third factor 110 times the scaled corrected current $I_D$ 97, for example "$206 \times I_D$".

Figures 10, 11:
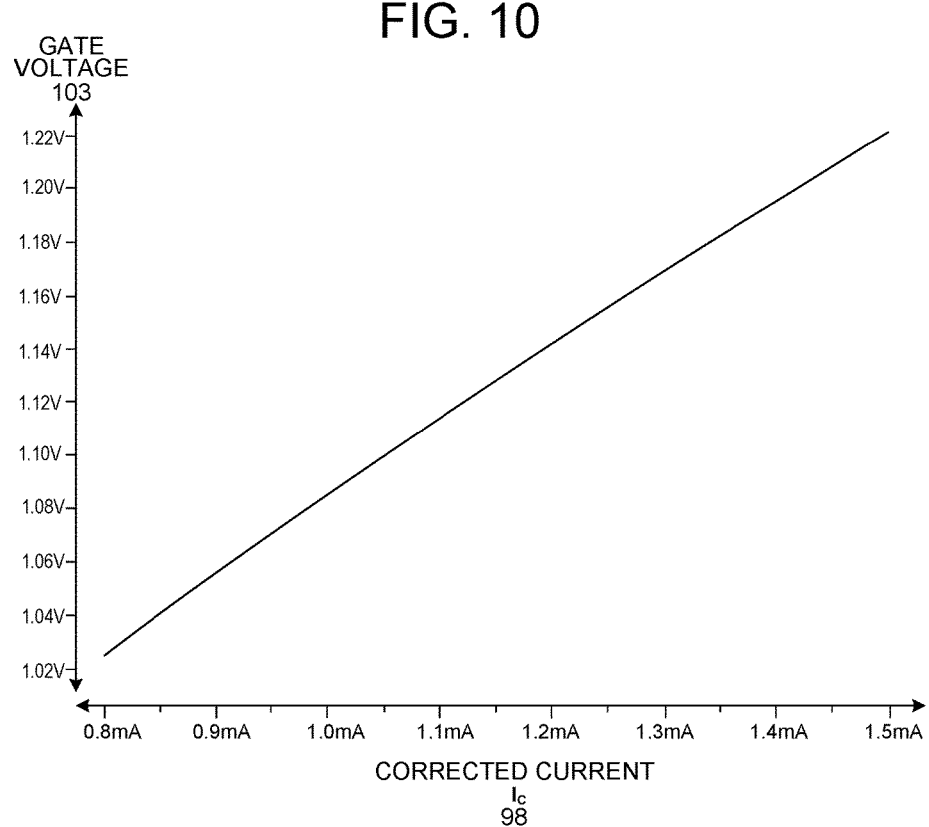
FIG. 10 is a table 300 showing the substantial improvement in stability and size of the output current that is achieved by the current driver 51 as compared to the current drivers 10 and 30.
FIG. 11 is a diagram showing how the gate voltage 103 is a function of the corrected current $I_C$ 98.

FIG. 10 is a table 300 showing the substantial improvement in stability and size of the output current that is achieved by the current driver 51 as compared to the current drivers 10 and 30. The variation of the current through the diode being driven by the current driver 51 is less than five percent when the output voltage is anywhere between 0.3 volts and 2.4 volts and significantly smaller in area than current driver 30.

FIG. 11 is a diagram showing how the gate voltage 103 is a function of the corrected current $I_C$ 98. The gate voltage 103 is supplied onto a gate of the current driver transistor 77 and controls current flow through the diode 54.

Figure 12:
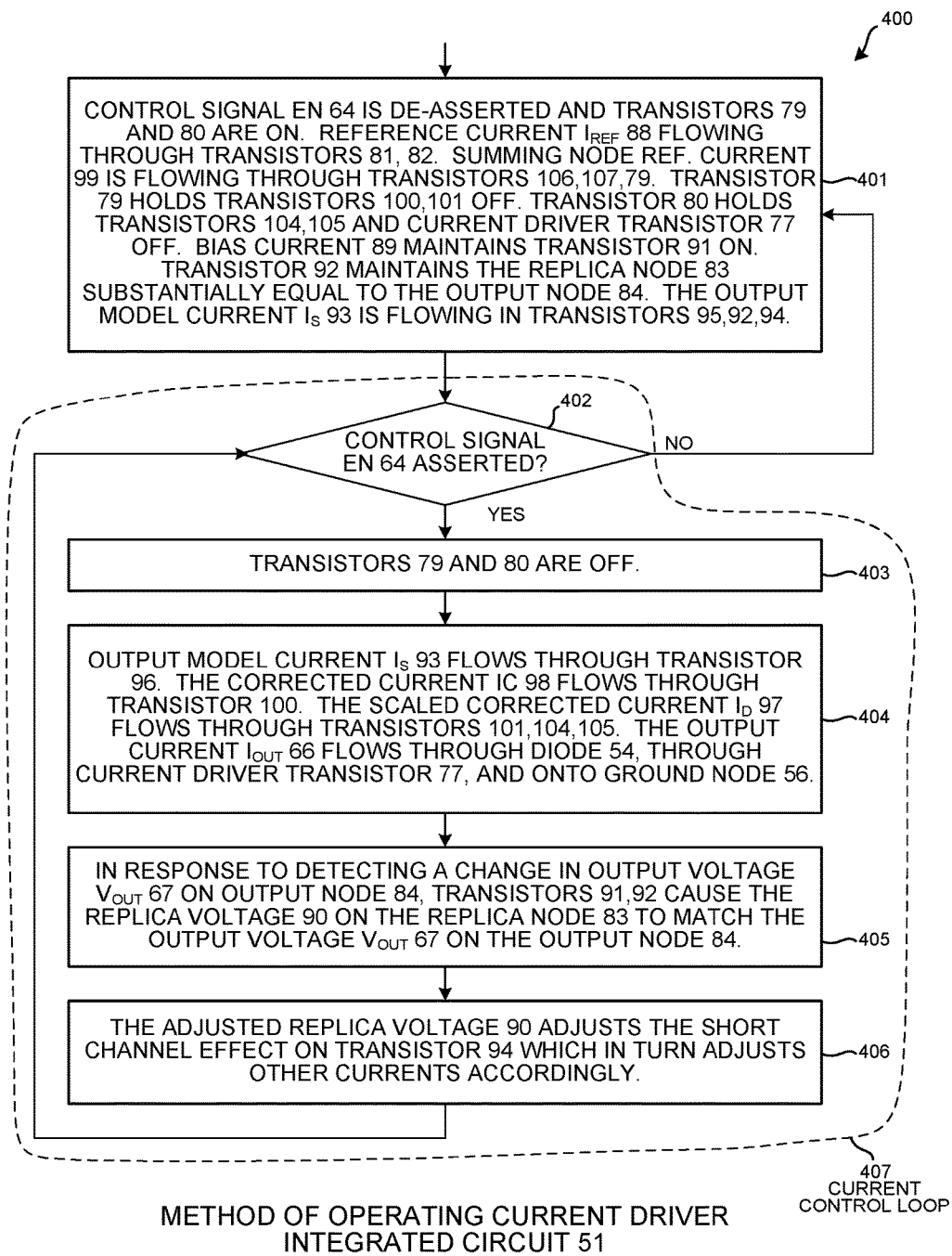
FIG. 12 is a flowchart of a method 400 in accordance with another novel aspect.

FIG. 12 is a flowchart of a method 400 in accordance with another novel aspect. Method 400 is a method of operating the current driver circuit 51. A first step 401 identifies the state of various transistors of the current driver $I_C$ 51 before the control signal EN 64 is asserted and current is not conducting through the diode 54. Steps 402-406 identify a novel current control loop that maintains the output current within five percent of the desired output current level while current is conducting through the diode 54.

In a first step (step 401), the control signal EN 64 is de-asserted and the transistors 79 and 80 are on. Reference current $I_{REF}$ 88 conducts through transistors 81 and 82. The summing node reference current 99 is flowing through transistors 106, 107, and 79. The transistor 79 maintains transistors 100 and 101 in a non-conductive state. Transistor 80 maintains transistors 104 and 105 of the CCGVC circuit 74 in a non-conductive state and transistor 80 also maintains current driver transistor 77 in a non-conductive state. Bias current 89 maintains transistor 91 in a conductive state. Transistor 92 maintains a voltage on the replica node 83 substantially equal to the output voltage $V_{OUT}$ 67 on the output node 84. The output model current $I_S$ 93 is flowing in transistors 95, 92, and 94.

In a second step (step 402), it is determined whether the control signal EN 64 is asserted. If the control signal EN 64 is de-asserted (for example, a digital logic low level), then the method proceeds to initial step 401. If, on the other hand, the control signal EN 64 is asserted (for example, a digital logic high level), then the method 400 proceeds to the steps of the current control loop 407.

In a third step (step 403), transistors 79 and 80 are switched from a conductive state to a non-conductive state. The control signal EN 64 is supplied onto the gate of the transistor 79 causing transistor 79 to switch off. Inverter 78 supplies an inverted version of the control signal EN 64 onto the gate of transistor 80 causing transistor 80 to switch off. Transistors 79 and 80 are of opposite conductivity types. For example, transistor 79 is P-type Field Effect Transistor (P-type FET) and transistor 80 is an N-type Field Effect Transistor (N-type FET).

In a fourth step (step 404), output model current $I_S$ 93 flows through transistor 96. The corrected current $I_C$ 98 flows through transistor 100. The scaled corrected current $I_D$ 97 flows through transistors 101, 104, and 105. The output current $I_{OUT}$ 66 flows through diode 54, through current driver transistor 77, and onto ground node 56.

In a fifth step (step 405), in response to detecting a change in output voltage $V_{OUT}$ 67 on output node 84, transistors 91 and 92 cause the replica voltage 90 on the replica node 83 to match the output voltage $V_{OUT}$ 67 on the output node 84.

In a sixth step (step 406), the adjusted replica voltage 90 adjusts the short channel effect on transistor 94 which in turn adjusts other currents accordingly. Next, the method proceeds to step 402 where it is determined whether to remain in the current control loop 407 if the control signal EN 64 is asserted, or to return to the initial step of 401 if the control signal EN 64 is de-asserted.

Although the present invention has been described in connection with certain specific embodiments for instructional purposes, the present invention is not limited thereto. For example, although the current driver IC 51 of FIG. 6 sinks current from the LED 54 to ground, in other embodiments, the current driver IC 51 is coupled between the supply node and the LED 54 such that the current driver IC 51 sources current from the supply node 55 through the LED 54, and onto ground node 56.

The example of FIG. 6 uses a Direct Current (DC) voltage source 52 for supplying the LED 54. In another example, an Alternating Current (AC) source is used to supply the LED 54. For example, a rectifier is used to rectify an AC voltage from the AC source. A switching regulator receives the rectified AC voltage and supplies a fixed DC voltage onto the supply node 55.

Although the current driver IC 51 has only one control terminal 61 onto which the controller IC 53 supplies the control signal EN 64, in other examples, the current driver IC has more than one control terminal. For example, in another embodiment, the current driver 51 is configured to receive a current control signal. The current control indicates a desired output current to send through the LED 54. The current control signal is used by the current driver IC 51 to set the various currents of the control loop such that the output current $I_{OUT}$ 66 is at the desired current level indicated by the current control signal.

In the example of FIG. 6, the supply voltage VDD is between 2.7V and 3.3V and the output voltage $V_{OUT}$ extends approximately 2V. It is appreciated that these voltage ranges are but one example, and in other embodiments, the novel current driver IC 51 can be used with substantially higher voltages (greater than 12V). In other embodiments, the output voltage $V_{OUT}$ extends over a significantly greater range (more than 10V), yet the novel current driver IC 51 operates to maintain the output current $I_{OUT}$ within five percent of the desired output current level. Accordingly, various modifications, adaptations, and combinations of various features of the described embodiments can be practiced without departing from the scope of the invention as set forth in the claims.

What is claimed is:

1. An apparatus comprising:
    an output node;
    a ground node;
    a bias current node;
    a replica node;
    a summing node;
    a current driver transistor;
    a summing node reference current generator circuit, wherein the summing node reference current generator circuit generates a summing node reference current on the summing node;
    voltage detector circuit, wherein during an operating mode the voltage detector circuit detects an output voltage on the output node and generates a replica voltage on the replica node;
    an Output Model Current Mirror (OMCM) circuit, wherein the OMCM circuit receives the replica voltage generated by the voltage detector circuit and generates an output model current, and wherein the output model current is supplied onto the summing node;
    a Corrected Current Mirror (CCM) circuit that generates a scaled corrected current, wherein the CCM circuit generates the scaled corrected current by scaling a corrected current, and wherein the corrected current is a difference between the summing node reference current and the output model current; and
    a Corrected Current to Gate Voltage Converter (CCGVC) circuit, wherein the CCGVC circuit converts the scaled corrected current into a gate voltage that is supplied onto the gate of the current driver transistor.

2. The apparatus of claim 1, wherein the apparatus is a packaged integrated circuit, wherein the packaged integrated circuit comprises an output integrated circuit package terminal and a ground integrated circuit package terminal, wherein the output integrated circuit package terminal is a part of the output node, and wherein the ground integrated circuit package terminal is a part of the ground node.

3. The apparatus of claim 1, wherein the summing node reference current on the summing node is a substantially stable and constant current during the operating mode, wherein the summing node reference current is generated from a current generated by a reference current generator, wherein the summing node reference current is a scaled version of the current generated by the reference current generator, and wherein the gate voltage is a function of the scaled corrected current.

4. The apparatus of claim 1, wherein a decrease in the output model current during the operating mode results in a corresponding increase in the corrected current, and wherein a decrease in the output model current during the operating mode results in a corresponding increase in the scaled corrected current.

5. The apparatus of claim 1, wherein a drain terminal of the current driver transistor is coupled to the output node, and wherein the current driver transistor is an N-channel Field Effect Transistor.

6. The apparatus of claim 1, wherein the voltage detector circuit comprises:
    a first transistor having a first terminal, a second terminal, and a third terminal, wherein the first terminal is coupled to the bias current node, wherein the second terminal is coupled to the output node, and wherein the third terminal is coupled to the bias current node; and
    a second transistor having a first terminal, a second terminal, and a third terminal, wherein the first terminal is coupled to a transistor of the output model current mirror circuit, wherein the second terminal is coupled to the replica node, and wherein the third terminal of the second transistor is coupled to the third terminal of the first transistor.

7. The apparatus of claim 1, further comprising:
    a control terminal, wherein the operating mode is enabled in response to a digital signal on the control terminal switching from a first digital logic level to a second digital logic level;
    a supply terminal, wherein the reference current generator is supplied by the supply voltage terminal;
    a ground terminal, wherein the ground terminal is coupled to a source terminal of the current driver transistor; and
    a drive terminal, wherein the drive terminal is coupled to a drain terminal of the current driver transistor.

8. The apparatus of claim 1, wherein the output node is coupled to a cathode of a diode, and wherein during the operating mode the current driver transistor sinks current from the diode to the ground node.

9. The apparatus of claim 1, wherein during the operating mode an output current on the output node varies less than five percent when an output voltage is between 0.3 volts and 2.4 volts, and wherein the output voltage is present between the output node and the ground node.

10. A method comprising:
    (a) supplying a summing node reference current onto a summing node of a current driver circuit;
    (b) detecting an output voltage on an output node of the current driver circuit during an operating mode of a current driver circuit;
    (c) generating a replica voltage from the output voltage detected in (b), wherein the replica voltage is supplied onto a replica node;
    (d) generating an output model current using the replica voltage present on the replica node, wherein the output model current is supplied onto the summing node;
    (e) generating a corrected current using the output model current and the summing node reference current, wherein the corrected current is a difference between the summing node reference current and the output model current; and
    (f) generating and supplying a gate voltage onto a current driver transistor, wherein the gate voltage is generated from a current proportional to the corrected current, wherein the current driver transistor is part of the current driver circuit, and wherein the current driver transistor has a terminal coupled to the output node.

11. The method of claim 10, wherein the replica voltage generated in (c) varies proportionally to the output voltage detected in (b) present on the output node of the current driver circuit, and wherein the gate voltage is generated using the corrected current generated in (e).

12. The method of claim 10, wherein the output node is coupled to a cathode of a diode, and wherein during the operating mode the current driver circuit causes a current to conduct from the cathode of the diode, through the output node, through the current driver transistor, and to a ground node.

13. The method of claim 10, wherein the supplying of the summing node reference current in (a) further comprises:
  (a1) generating a reference current using a reference current generator;
  (a2) scaling the reference current to generate the summing node reference current, wherein a current level of the summing node reference current is greater than and proportional to the reference current generated in (a1); and
  (a3) supplying the summing node reference current to the summing node such that a current level of the summing node remains substantially constant during the operating mode.

14. The method of claim 10, further comprising:
  (h) supplying a bias current onto the voltage detector circuit, wherein the supplying of (h) occurs before the supplying of (a), and wherein the voltage detector circuit is part of the current driver circuit.

15. The method of claim 10, wherein (a) through (f) in part cause an output current on the output node to vary no more than five percent when the output voltage is between a voltage range, wherein the voltage range extends across at least 2.0 volts.

16. The method of claim 15, wherein the voltage range extends between 0.3 volts and 2.4 volts.

17. An integrated circuit device comprising:
  an output terminal that is coupled to a terminal of a diode, wherein during a mode of operation of the integrated circuit device an output current is present on the output terminal, and wherein an output voltage is present between the output terminal and a ground terminal; and
  means for limiting a variation of the output current during the mode of operation to be less than five percent when the output voltage is within a voltage range that extends across at least 2.0 volts.

18. The integrated circuit device of claim 17, wherein the means for limiting comprises a reference current generator, a summing node reference current generator circuit, a voltage detector circuit, an output model current mirror circuit, a corrected current mirror circuit, and a corrected current to gate voltage converter circuit.

19. The integrated circuit device of claim 17, wherein the voltage range extends from 0.3 volts to 2.4 volts.

20. The integrated circuit device of claim 17, wherein during the mode of operation of the integrated circuit device the output current conducts from the terminal of the diode, through the output terminal, through a transistor, and to a ground node.

* * * * *